United States Patent [19]

Lee

[11] Patent Number: 5,331,474
[45] Date of Patent: Jul. 19, 1994

[54] EDITING APPARATUS AND METHOD IN VIDEO TAPE DUPLICATING SYSTEM

[75] Inventor: Hyeong-ju Lee, Seoul, Rep. of Korea

[73] Assignee: SamSung Electronics Co., Ltd., Kyungki-do, Rep. of Korea

[21] Appl. No.: 818,568

[22] Filed: Jan. 9, 1992

[30] Foreign Application Priority Data

Mar. 29, 1991 [KR] Rep. of Korea ............... 91-4989

[51] Int. Cl.$^5$ .................. G11B 27/02; G11B 5/86; H04N 9/79
[52] U.S. Cl. ............................. 360/13; 360/15; 358/311
[58] Field of Search .............. 360/13, 14.3, 15, 14.1, 360/14.2; 358/310, 311

[56] References Cited

U.S. PATENT DOCUMENTS

| | | | |
|---|---|---|---|
| 3,733,444 | 5/1973 | French, Jr. | 360/13 |
| 4,272,790 | 6/1981 | Baks | 360/10.1 X |
| 4,351,007 | 9/1982 | Youngquist | 360/13 |
| 4,570,192 | 2/1986 | Hori | 360/14.2 |

Primary Examiner—Aristotelis Psitos
Assistant Examiner—Jennifer Pearson
Attorney, Agent, or Firm—Robert E. Bushnell

[57] ABSTRACT

Disclosed are an editing apparatus and a method in a vide tape duplicating system for effectively editing using an automatic search function of the starting and ending points of a program to be edited. The editing apparatus includes a key input, an edit adjuster, a playback system, a recording system, a display and a system controller. The edit adjuster controls the editing operation to allow a playback signal within a preset editing section output from the playback system to be recorded on the recording system in accordance with the output signal of the key input. The editing method is performed by a first editing step of setting starting and ending points for at least one editing sections on a recording medium in the playback driver, and controlling the editing operation by the detection of the starting and ending points marking information on the editing section which is randomly set from points between the initial point and the final point of the recording medium. The second editing step selects one editing section from at least one set on the recording medium, and edits by detecting the starting and ending points of the set editing section. Therefore, a desired editing section can be randomly designated. Then, editing is controlled by detecting the designated information, thereby enabling a video tape duplicating system to precisely edit various programs.

20 Claims, 6 Drawing Sheets

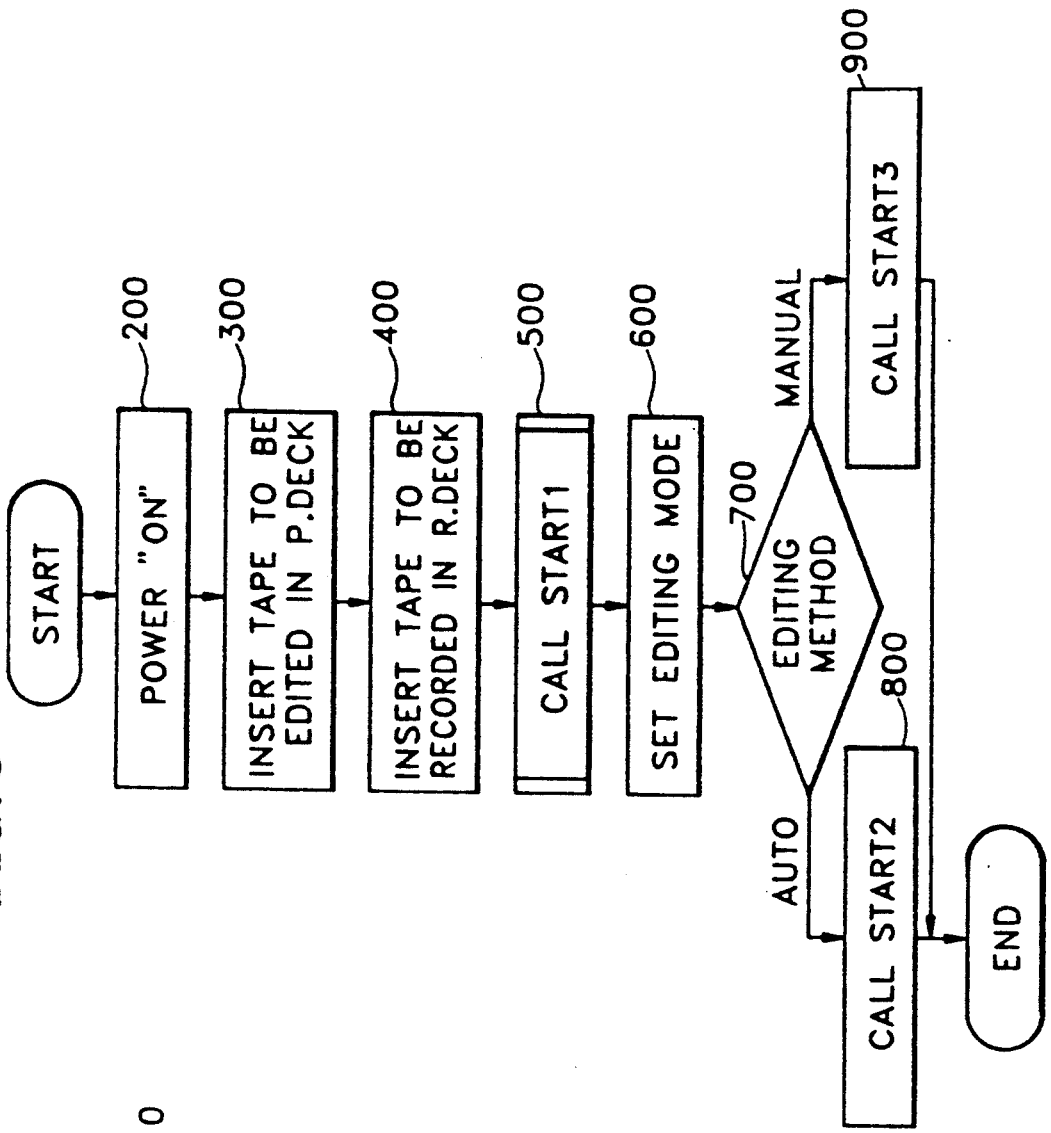

EDITING APPARATUS AND METHOD IN VIDEO TAPE DUPLICATING SYSTEM

BACKGROUND OF THE INVENTION

The present invention relates to an editing apparatus and a method in an audio/video information duplicating system, and more particularly to an editing apparatus in an audio/video information duplicating system which edits a program by the automatic search of starting and ending points, and an editing method suitable for controlling the editing apparatus.

Generally, a recording/reproducing system is composed of a recording system to record audio and video information on a recording medium, and a playback system to reproduce the audio and video information recorded on the recording medium. Such an audio/video information duplicating system includes two recorder/reproducers connected to each other (one for the playback deck and the other for the recording deck), wherein the information recorded in one recorder/reproducer is duplicated (or recorded) on the other recorder/reproducer. In particular, a system which embodies two recorder/reproducers as above together in one unit is known as a double-deck recorder/reproducer.

The recording medium, e.g., a video tape, of the recorder/reproducer includes a video track for recording and reproducing video information, an audio track for recording and reproducing audio information, and a control track for recording and reproducing reference signals to control traveling speed, phase, and other operations. Especially, binary information in the form of "0" and "1" is recorded on the control track through "N" and "S" magnetic poles at a density of 1 bit per two video tracks. In other words, 1 bit per frame is recorded, and the logic "0's" and "1's" are regularly set by a predetermined duty ratio.

With the current trend toward performing many diverse functions in the recorder/reproducer, a high speed search function has been added to find a desired program among a plurality of programs recorded on a recording medium by altering the duty ratio of the control track. The Video Index Search System (hereinafter referred to as VISS) is one kind of such a function, wherein index information is recorded on a certain point of the recording medium in a predetermined manner, and the recorded index information is sequentially searched by operating a VISS control key during the operation of the recording medium. After searching the index information, the PLAY mode is initiated to confirm whether or not the program corresponding to the searched index information is the desired one. If not, repeated index information searches are carried out by the use of the VISS control key until the corresponding index information is found.

However, in the conventional audio/video information duplicating system, the duplicating method (dubbing or editing process) is greatly restricted. For example, to search a desired program for duplication, several function keys need to be repeatedly operated to control the fast forward (FF) or PLAY modes in the playback deck, making the process inconvenient. Therefore, to solve this problem, proposals have been made to utilize apparatuses adopting the aforesaid VISS information system. By using the VISS information, the FF and PLAY mode key operation is simplified. Further, the desired program can be quickly and easily detected, reproduced, and duplicated.

However, the VISS information system still has a problem in that a plurality of function keys need to be repeatedly pressed until the corresponding index information is found. In addition to this, after searching the desired program, when duplication is performed by the aforesaid two methods of control key operation, accurate duplication is not achieved in the course of converting to the PLAY mode in the playback deck and to the recording (REC) mode in the recording deck.

SUMMARY OF THE INVENTION

Accordingly, it is an object of the present invention to provide an editing apparatus and a method in an audio/video information duplicating system, wherein an editing section is randomly preset using starting point and ending point markings. Then, edit duplication is to be performed by the automatic search of the marking information.

To accomplish the above object, according to the present invention, there is provided an editing apparatus used for an audio/video information duplicating system comprising:

a key input for transferring user-designated command and information;

a playback system including a playback deck driver for driving a playback deck, and outputting a playback signal;

a recording system including a recording deck driver for driving a recording deck, and recording the playback signal, the recording system being formed in a unit together with the playback system;

an edit adjuster for controlling editing operation that allows the playback signal within a preset editing section output from the playback deck to be recorded on the recording deck in accordance with the output signal of the key input;

a dubbing portion for transferring video playback information from the playback system to the recording system;

a display for displaying the video information output from the playback system; and a system controller that marks starting and ending points of the editing section on a recording medium of the playback system when a control command for setting the editing section is applied through the key input, and controls the edit adjuster's operation in accordance with the detection of the marking information when an editing control command is applied through the key input.

An editing method suitable for operating an audio/video information duplicating system including a recording system having a recording deck driver and a playback system having a playback deck driver, the recording system and playback system being formed in a unit, a dubbing portion, a display, a key input, an edit adjuster, and a system controller, comprising the steps of:

setting an editing section to indicate starting and ending points of at least one section to be edited in a program which was recorded on the recording medium in a playback deck through the key input;

detecting marking information about the starting and ending points set in the step of setting an editing section while automatically shifting the playback deck's operational modes such as the FF, STOP, and the to REW modes after the editing mode is set by the key input;

automatically duplicating the signal reproduced in the playback system onto the recording system upon detecting the starting point by the detecting step, returning to the step of detecting a marking information upon detecting the ending point, and continuously checking for marking information from the initial point to the final point of the recording medium in the playback deck, thereby performing automatic duplication.

BRIEF DESCRIPTION OF THE DRAWINGS

The object and features of the present invention will become more readily apparent from the following detailed description of the preferred embodiments taken in conjunction with the accompanying drawings in which:

FIGS. 3A to 3D are output waveforms of the flip-flops of the edit adjuster shown in FIG. 2;

FIG. 4 shows a remote controller serving as the key input of the editing apparatus shown in FIG. 1;

FIG. 5 is a flowchart showing the operation of the editing apparatus shown in FIG. 1;

DETAILED DESCRIPTION OF THE INVENTION

Now, referring to the attached drawings, a preferred embodiment of the present invention will be described in detail hereinbelow.

Figure 1:
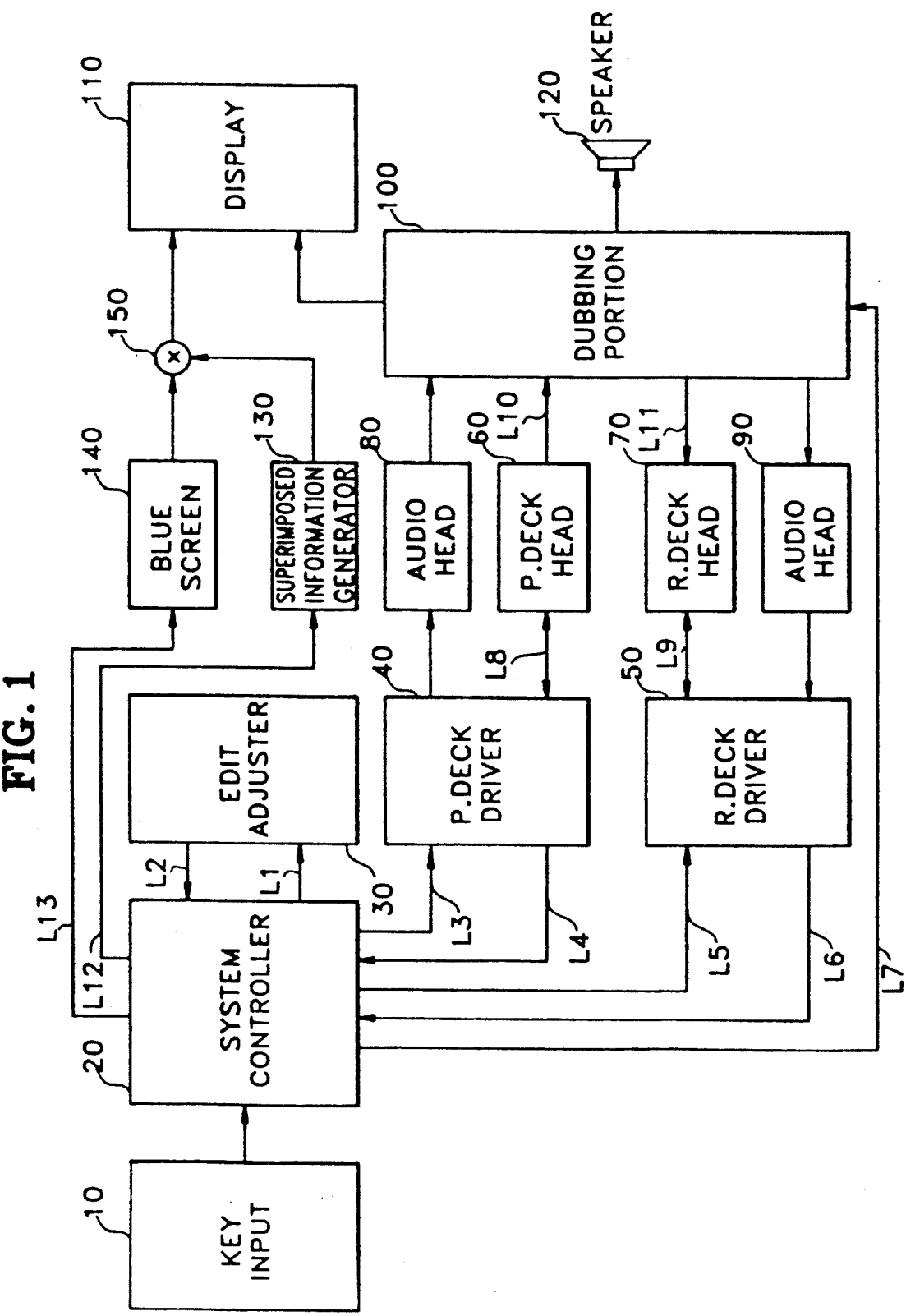
FIG. 1 is a block diagram of an editing apparatus according to the present invention.

FIG. 1 shows an embodiment of an editing apparatus according to the present invention, which includes a key input 10; a system controller 20 connected to key input 10; a superimposed information generator 130 and a blue screen 140 each connected to the system controller 20; a mixer 150 receiving respective inputs from superimposed information generator 130 and blue screen 140 and providing an input to a display 110; an edit adjuster 30 interconnected with system controller 20, a playback deck driver 40 and a recording deck driver 50 each interconnected with system controller 20; a playback deck head 60 and a playback audio head 80 each connected to playback deck driver 40; a recording deck head 70 and recording audio head 90 each connected to recording deck driver 50; a dubbing portion 100 which has connections to playback deck head 60, recording deck head 70, playback audio head 80, recording audio head 90, system controller 20, display 110, and a speaker 120.

Figure 2:
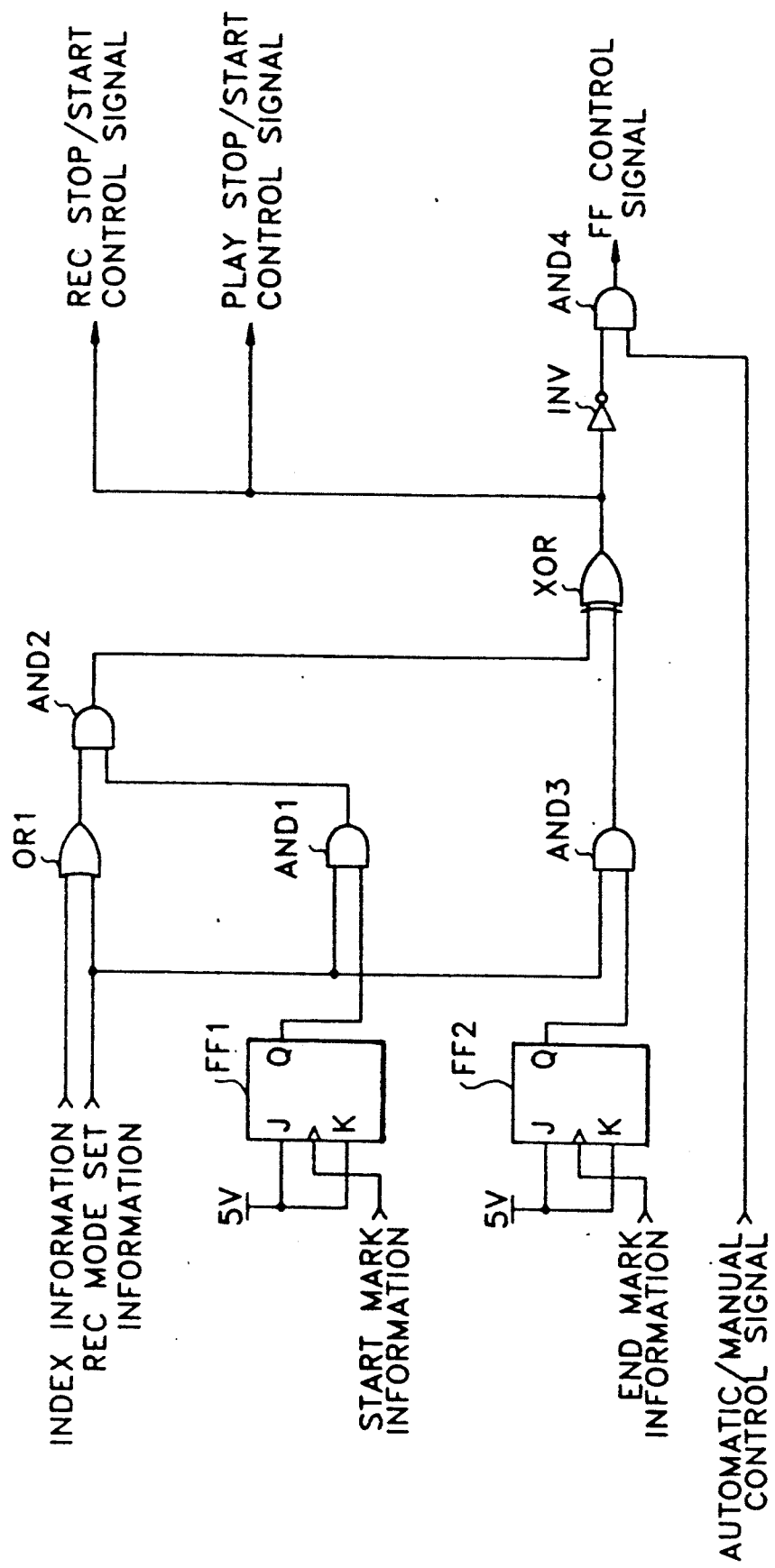
FIG. 2 is a circuit diagram of an example of an edit adjuster of the editing apparatus shown in FIG. 1.

FIG. 2 is a preferred embodiment of the edit adjuster 30 shown in FIG. 1, which is constructed to receive input signals such as index information, REC mode set information, starting point (hereinafter referred to as START) mark information, ending point (hereinafter referred to as END) mark information, and an automatic/manual control signal, all of which are supplied from system controller 20. Edit adjuster 30 supplies a REC STOP/START control signal, a PLAY STOP/START control signal, and an FF control signal to system controller 20. In further detail, edit adjuster 30 is composed of a first OR gate OR1 that receives the index information and REC mode set information as input signals; a first flip-flop FF1 having the START mark information as a clock signal; a first AND gate AND1 that receives the REC mode set information and the non-inverted output Q from first flip-flop FF1 as input signals; a second AND gate AND2 that receives the output signals from first OR gate OR1 and first AND gate AND1 as input signals; a second flip-flop FF2 having the END mark information as a clock signal; a third AND gate AND3 that receives the REC mode set information and the non-inverted output Q from second flip-flop FF2 as input signals; an exclusive OR gate XOR which is connected to receive the outputs of second and third AND gates AND2 and AND3, while providing a REC STOP/START control signal and a PLAY STOP/START control signal as inputs to system controller; an inverter INV which also receives the output of the exclusive OR gate XOR as an input; and a fourth AND gate AND4 which is connected to receive the outputs of inverter INV and the automatic/manual control output from system controller 20, and supply a FF control signal as an output to system controller 20. The edit adjuster 30 operates when editing is carried out in a predetermined manner using the playback deck in which the editing section has already been set.

FIGS. 3A through 3D show output waveforms pertaining to the flip-flops illustrated in FIG. 2. Here, FIG. 3A illustrates the START mark information; 3B, the END mark information; 3C, the waveform of the non-inverted output Q of the first flip-flop; and 3D, the waveform output from the non-inverted output Q of the second flip-flop.

FIG. 4 is an example of the key input 10 shown in FIG. 1, and simply shows editing operation function keys provided in a remote controller. The operation of the function keys are as follows: INDEX is a key for designating automatic search stand-by, mode REC is for stand-by operation to edit using the automatic search function, AUTO is for automatic editing, MANUAL is for manual editing, S.MARK is for VISS marking or REC start marking, E.MARK is for end marking, and ERASE is for erasing the control information marked by the S.MARK or E.MARK.

FIG. 5 is a flowchart illustrating the operation of the editing apparatus shown in FIG. 1. Steps 200 through 400 are for preparing the editing, step 500 is for setting an editing section, steps 600 to 700 are for selecting the editing method, step 800 is for automatic editing, and step 900 is for manual editing.

Figure 6:
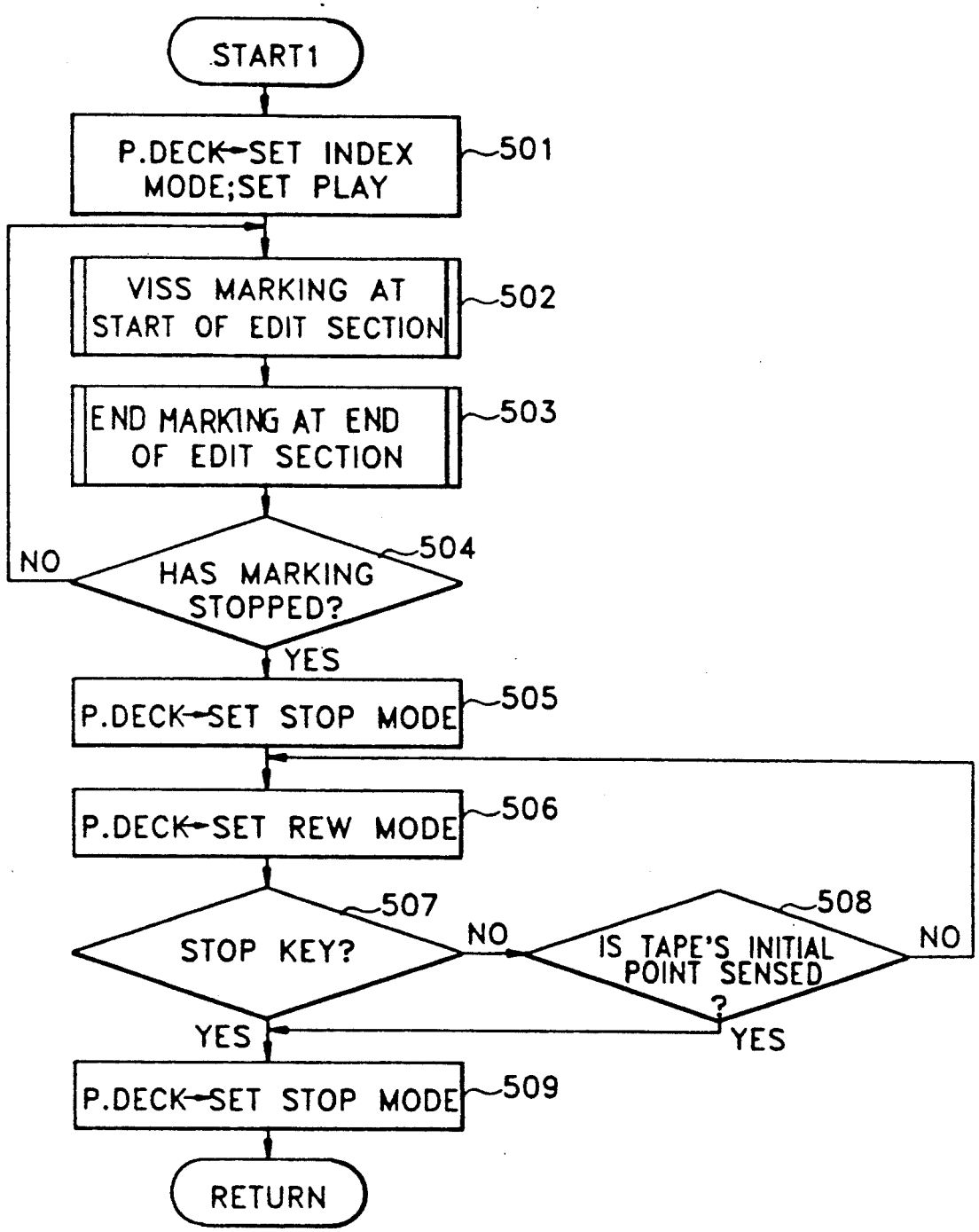
FIG. 6 is a flowchart showing the subroutine of the step for setting an editing section in the flow chart shown in FIG. 5.

FIG. 6 is a detailed flowchart corresponding to step 500 shown in FIG. 5, wherein steps 501 through 504 are for setting the editing section, and steps 505 through 509 are for setting the stand-by to edit in the playback deck (hereinafter referred to as P.DECK).

Figure 7:
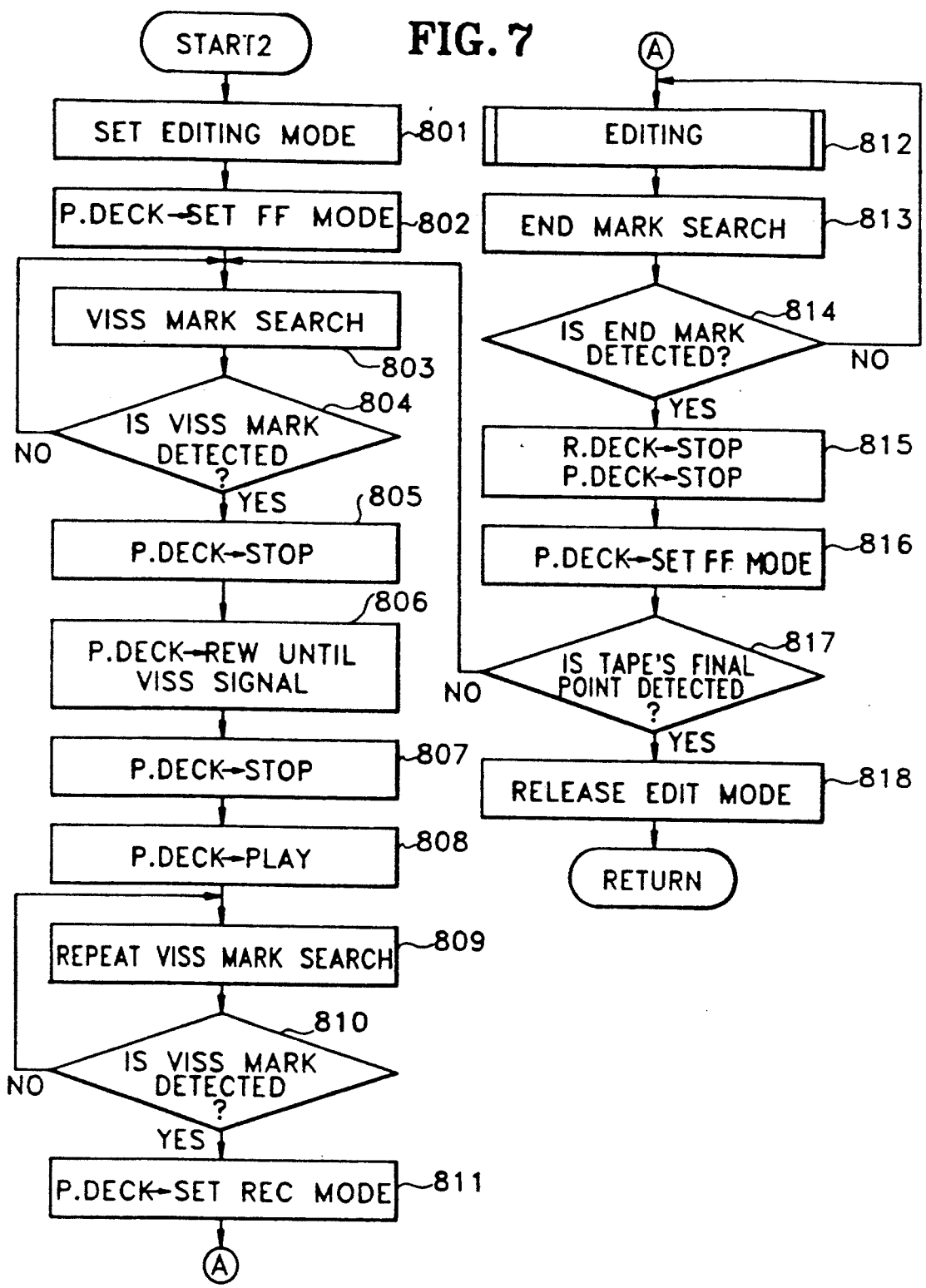
FIG. 7 is a flowchart showing the subroutine of the step for automatic editing in the flow chart shown in FIG. 5.

FIG. 7 is a detailed flowchart corresponding to step 800 of FIG. 5, wherein step 801 is for setting the automatic editing mode, steps 802 through 810 are for detecting the VISS (starting point) mark, steps 811 and 812 are for conducting the editing operation, steps 813 through 815 are for detecting the END mark, and steps 816 through 818 are for release from the editing mode.

Figure 8:
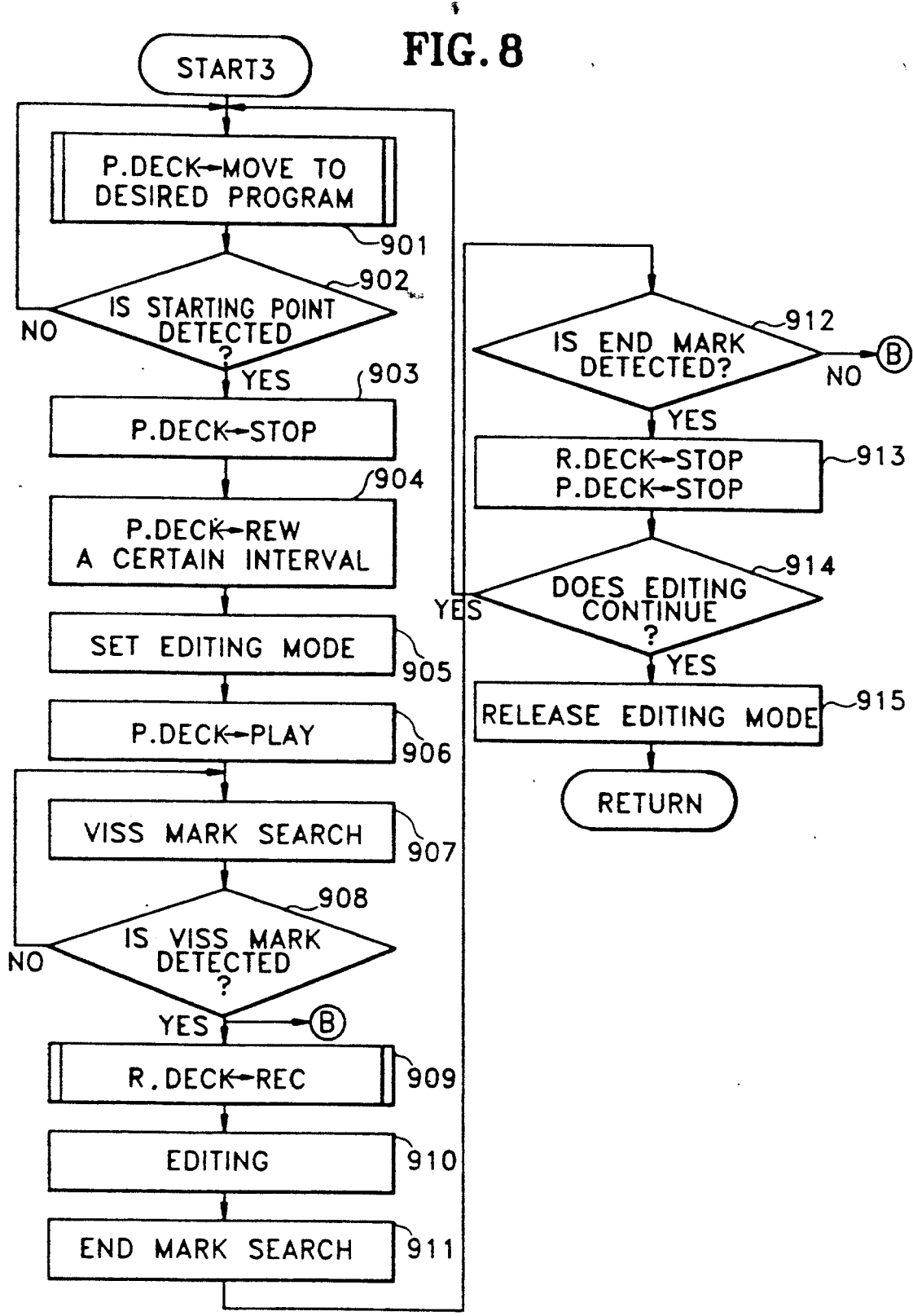
FIG. 8 is a flowchart showing the subroutine of the step for manual editing in the flow chart shown in FIG. 5.

FIG. 8 is a detailed flowchart corresponding to step 900 of FIG. 5, wherein steps 901 through 904 are for detecting a first editing point; step 905 is for setting the editing mode, steps 906 and 907 are for detecting the second editing point, steps 909 and 910 are for performing the editing operation, steps 911 and 912 are for detecting the END mark, and steps 913 through 915 are for release from the editing mode.

Now, the operation of FIGS. 1 and 2 are described in detail with reference to FIGS. 3 through 8. More particularly, the description shall be made based on the flowcharts shown in FIGS. 4 through 8.

The playback driver 40 and the recording deck playback driver 50 include a playback deck and an recording deck (not shown) for reproducing and recording, respectively, and are composed of conventional signal processing circuits. The dubbing portion 100 is also known art and functions by faithfully transferring the playback signal (video and audio signals) from the P.DECK to the recording deck (hereinafter referred to as R.DECK) in accordance with a control signal from system controller 20. The blue screen 140 is a circuit to display a blue background on display 110 when system controller 20 instructs superimposed information generator 130 to superimpose information.

First, the power is turned on through key input 10 of FIG. 1 (step 200). A tape on which programs are recorded is inserted to be edited in the P.DECK within playback deck driver 40 (step 300). A blank tape on which edited information will be recorded is inserted in the R.DECK within recording deck driver 50 (step 400).

Then, a program to be edited is set among the plurality of programs recorded on the tape in the P.DECK in accordance with the control signal applied through key input 10 (step 500). Here, it is assumed that key input 10 is a remote controller including the function keys shown in FIG. 4. When the INDEX key of key input 10 is controlled for setting a section to be edited, system controller 20 outputs a high logic index bit to the edit adjuster 30 through a line L1. However, since the index bit applied through line L1 is high and other input signals (including the REC mode set information) are at a low logic state, the edit adjuster 30 constructed as shown in FIG. 2, does not output a specific signal for controlling the P.DECK and R.DECK to system controller 20. Thus, a user presses the PLAY key of key input 10 to output a control signal, making the P.DECK perform a PLAY. This causes the P.DECK to read the recorded information from the recording medium as an electrical signal through playback deck head 60 and audio head 80, and to output the audio information to speaker 120 and the video information to display 110 through dubbing portion 100.

The INDEX control signal of system controller 20 is supplied to superimposed information generator 130 through a line L12, thereby generating the corresponding superimposed information. System controller 20 simultaneously controls blue screen 140 through a line L13 to make the background of the superimposed information blue. The outputs of blue screen 140 and superimposed information generator 130 are mixed at mixer 150 and output to display 110. Both the superimposed information and the background color are displayed in a predetermined region of the displayed picture. Examples of the superimposed information are the current mode, the number of selected programs or the set program, START and END markings, etc.

While reproducing audio/video information via the P.DECK using display 110 and speaker 120, VISS marking is carried out at the starting point of the section to be edited (step 502). For the VISS marking, when the S.MARK function key of the remote controller in FIG. 4 is pressed at the aforesaid starting point, system controller 20 changes the control pulse's duty ratio of the starting point on the video tape in the playback deck driver 40 into a VISS duty ratio for standard VHS. Upon completion, the VISS marking of the starting point is displayed on display 110 as superimposed information such as a cursor.

Similar to the VISS marking, when the E.MARK function key of the remote controller is pressed at the desired ending point during reproduction, END marking is also completed but by a different duty ratio from the foregoing VISS (start marking) duty ratio. The duty ratio of the END mark is negligible as compared with that of the VISS mark. In more detail, when the duty ratio of the N to S magnetic poles of the general control pulse is 5:5, that of the VISS marking is 3:7, and that of the END mark is in the vicinity of 5:5, e.g., 5.5:4.5.

These VISS and END markings continue until the operating mode of the P.DECK is changed to the STOP by sensing the final point of the tape (step 504). However, if the VISS and END markings are finished before sensing the final point, the user can stop the P.DECK's operation by pressing the STOP key of key input 10 (step 505). Next, in step 506, the P.DECK executes the rewind function (hereinafter referred to as REW). If the STOP key is pressed during REW, the P.DECK is set to the STOP mode (steps 507 and 509). If the STOP key is not pressed, the P.DECK will also be set to the STOP mode by sensing the initial point of the tape (steps 508 and 509).

The editing section set by the above method is edited by a set editing method. The setting method can be classified into two methods: automatic editing by an AUTO key and manual editing by a MANUAL key, both shown in FIG. 4. Accordingly, through input key 10, the desired method is set (step 600). In step 700, system controller 20 determines whether the control signal of the set editing method (supplied from the key input 10) is automatic or manual.

When the automatic editing is set in step 700, this method is performed as below.

First, system controller 20 sets the editing mode to for the overall system to automatic editing which includes the playback deck driver 40 and recording deck driver 50 (step 801). Especially, the recording deck driver 50 controls the R.DECK upon REC stand-by state since the editing stand-by state is not attained unless the REC MODE key is controlled even though the AUTO key is controlled as described in FIG. 4. Therefore, the REC mode set information from the system controller 20 always maintains a high logic state whenever the editing method is set to either automatic or manual, and automatic/manual control signal is output to the edit adjuster 30 through line L1. Accordingly, among the signals input to edit adjuster 30 through line L1, the REC mode set information and automatic/manual control signal are high logic. Thus, a low logic signal is applied to the clock terminals of the two flip-flops FF1 and FF2. Here, the first and second flip-flops FF1 and FF2 being JK flip-flops operate as toggle switches that change their output logic state whenever a clock signal is applied, since the J and K inputs are tied to 5V. Therefore, the non-inverted outputs Q from first and second flip-flops FF1 and FF2 go low. By this connection, each of the first through third AND gates AND1-AND3 outputs a low logic signal, to supply both inputs of exclusive OR gate XOR with a low logic signal. Exclusive OR gate XOR then outputs a low logic signal. Accordingly, the REC STOP/START and PLAY STOP/START control signals from edit adjuster 30 to system controller 20 through line L2 are both low, which results in letting the R.DECK and P.DECK maintain their STOP states.

Meanwhile, the output of the exclusive OR gate XOR is applied to the inverter INV to be inverted, making it high. Therefore, both inputs of fourth AND gate AND4 are supplied with high logic signals, one input from inverter INV and then from the automatic/manual control signal of system controller 20 through line L1, providing a high logic signal, as the FF control signal, to the system controller 20. System controller 20 outputs a control signal to the playback deck driver 40 through line L3, to allow the P.DECK to perform an FF function (step 802). Here, the playback deck driver 40 is constructed including the playback deck, and composed of a conventional signal processing circuit, as described above.

The playback deck driver 40 detects the VISS information which was marked while setting the editing section upon performing FF under the control of the system controller 20 (step 803). The VISS information was included in the playback information read from the recording medium by playback deck head 60 in the form of a picked up signal within the playback deck driver 40. When the marked VISS information is detected (step 804), the playback deck driver 40 informs system controller 20 of the detection of the VISS information through line L4. Accordingly, the START mark information of system controller 20 supplied to edit adjuster 30 through line L1 goes high.

The START mark information such as the waveform shown in FIG. 3A is applied as the clock signal of the first flip-flop FF1 in edit adjuster 30. Thus, at the rising edge of the START mark information applied to the clock terminal, the first flip-flop FF1 inverts the logic of the non-inverted output Q (FIG. 3C). High logic signals are thus applied to both inputs of the first AND gate AND1, and output high logic signal is supplied to the input of the second AND gate AND2. Since the signals applied to both inputs of the second AND gate AND2 are also high logic states, the output signal to exclusive OR gate XOR becomes high. In the meantime, since the signal from third AND gate AND3 applied to the other input terminal of exclusive OR gate XOR is low, exclusive OR gate XOR outputs a high logic signal. The output of exclusive OR gate XOR is supplied to the REC STOP/START and the PLAY STOP/START control signal terminals of system controller 20 through line L2, and inverter INV. The inverter INV outputs a low logic signal to one input of the fourth AND gate AND4, causing fourth AND gate AND4 to output a low logic signal and apply a low logic signal as the FF control signal input of system controller 20.

The system controller 20 detects the VISS information again, which was detected before execution of the editing operation to precisely detect the VISS information under the control of the edit adjuster 30. When the VISS information is detected, the operational mode of the P.DECK is converted from the FF mode to the STOP mode (step 805). Subsequently, in the REW (or reverse) mode, step 806 rotates the tape, e.g., about one frame in reverse, stopping at the point right before the position where the VISS information was detected (step 807). Then, the P.DECK is set to the PLAY mode by the control signal of system controller 20 in accordance with the output from edit adjuster 30 (step 808). At this time, the playback signal of the P.DECK is output to display 110 and speaker 120 through dubbing portion 100.

During the next stage, playback deck driver 40 repeats the aforesaid VISS mark search while the P.DECK is playing (step 809). When the VISS mark is detected, after the lapse of about one frame (step 810), the recording deck driver 50 make the R.DECK perform the REC function in response to the output signal of system controller 20 through line L5 (step 811). By controlling playback deck driver 40, the video and audio information reproduced in the playback deck head 60 and audio head 80 is output to display 110 and speaker 120 through dubbing portion 100. At the same time, audio/video information is recorded on the recording medium of the R.DECK through recording deck head 70 and audio head 90 (step 812).

While performing the editing operation as the above, the playback deck driver 40 continuously searches for an END mark as shown in FIG. 3B (813). When the END mark is detected in step 814, the END mark information supplied from system controller 20 to edit adjuster 30 through line L1 is output as a high logic signal. By this operation, a clock signal as shown in FIG. 3B is applied to the clock terminal of the second flip-flop FF2, thereby producing the non-inverted output Q shown in FIG. 3D. The third AND gate AND3 of which both input signals are high, outputs a high logic signal to one input of exclusive OR gate XOR. Meanwhile, the first flip-flop FF1 maintains its previous output state until before detecting the next START mark information. Therefore, the first AND gate AND1 also outputs a high logic signal. Exclusive OR gate XOR receives high logic signals at both inputs, its output is low.

The system controller 20 stops the PLAY and REC operations of the P.DECK and R.DECK (step 815), respectively since the REC STOP/START and PLAY STOP/START control signals of exclusive OR gate XOR from edit adjuster 30 are both low. At the same time, the high output logic state of exclusive OR gate XOR is supplied to fourth AND gate AND4 through inverter INV. The fourth AND gate AND4 thus outputs a high logic signal, and system controller 20 sets the P.DECK to the FF again (step 816).

Then, the starting and ending points of the predetermined editing section are detected by the steps described as the above. In particular, when a second starting point, as shown in FIG. 3A, is detected, the non-inverted output Q from the first flip-flop FF1 is inverted, becoming the low logic signal shown in FIG. 3C, and is then applied to the first AND gate AND1. Therefore, the first AND gate AND1 outputs a low logic signal, and according to this operation, the second AND gate AND2 also outputs a low logic signal. However, second flip-flop FF2 maintains its previous output state until just before detecting the next end mark information, third AND gate AND3 outputs a high logic signal. As a result, exclusive OR gate XOR outputs a high logic signal by exclusive ORing, thereby stopping the FF operation of the P.DECK and simultaneously starting the REC and PLAY. These editing section detecting steps are repeatedly performed until the final point of the video tape is sensed by a final sensor (not shown). When the final point of the video tape is detected (step 817), the editing method is exited (step 818), and the editing apparatus stops.

When the editing method is manual in step 700, the manual editing method is similar to the automatic editing method. However, according to the manual editing method, only one program can be edited among programs set by at least one editing section in a random manner. Therefore, before the editing operation, the video tape in the P.DECK should be moved close to the starting point of the desired program to be edited (step 901). The movement is executed by repeating the FF, STOP, and PLAY functions or by a conventional VISS mark search. Then, when the staring point of the desired program to be edited is detected (step 902), the operational mode of the P.DECK is changed to the STOP. After carrying out the REW mode as long as or longer than that in the automatic editing method, the operational mode is converted to the STOP mode. The user has firsthand control of the mechanism through key input 10 up to the foregoing steps. Then, by pressing the MANUAL key and REC MODE key of key input 10, precise VISS mark detection and the editing operation are performed as in the automatic editing method (steps 907 through 910). The editing operation is performed until the END mark is detected in steps 911 and 912. If the editing operation is again performed while the P.DECK and R.DECK are both in the STOP mode, the same process as in step 901 proceeds, and editing is implemented. If the editing operation does not continue in step 914, the editing mode is exited (step 918).

In the present invention, the desired section to be edited is irregularly set among one or a plurality of reproducing programs using VISS marking and END marking methods, and duplication is performed in accordance with the marked information detected during automatic or manual editing. Consequently, since the user can precisely edit various programs as desired, a video tape duplicating apparatus can be provided which is capable of effective editing.

What is claimed is:

1. An editing apparatus used for an audio/video information duplicating system comprising:
   key input means for receiving user-designated commands, and for generating a command signal;
   playback system means for driving a playback deck, to generate a playback signal from a first recording medium;
   recording system means for driving a recording deck, and for recording said playback signal on a second recording medium, said recording system means being formed in a unit together with said playback system means;
   edit adjuster means for controlling an editing operation that allows said playback signal within a preset editing section to be recorded onto said recording deck in accordance with said command signal of said key input means, said edit adjuster means;
   generating a first toggled signal in response to a start mark information signal,
   generating a second toggled signal in response to an end mark information signal,
   comparing a record mode signal indicating an editing mode of said editing apparatus and said first toggled signal to generate a first intermediate signal,
   comparing said record mode signal and an index information signal indicating setting of said preset editing section to be reproduced to generate a second intermediate signal,
   comparing said first and second intermediate signals to generate a third intermediate signal,
   comparing said record mode signal and said second toggled signal to generate a fourth intermediate signal,
   enabling transfer of said playback signal from said playback system means to said recording system means by comparing said third and fourth intermediate signals to generate a first mode control signal controlling operation of said playback system means and said recording system means,
   enabling said playback system means to fast forward said first recording medium to a starting point of said preset editing section;
   dubbing means for transferring said playback signal from said playback system means onto said recording system means;
   display means for displaying said playback signal from said playback system means; and
   system controller means for marking said starting point and an ending point of said preset editing section onto said first recording medium of said playback system means in response to said command signal, and controlling said edit adjuster mean's operation in accordance with a detection of the marking points of said preset editing section in response to said command signal;
   said playback system means fast forwarding said first recording medium to said starting point, said first recording medium rewinding a given distance after said first recording medium reaches said starting point, said recording system means recording said preset editing section onto said second recording medium until said ending pint is reached, and said playback system means and said recording system means stopping, during said recording of said playback signal from said first recording medium onto said second recording medium.

2. An editing apparatus as claimed in claim 1, wherein said edit adjuster means comprises:
   logic means for receiving a control signal from said system controller means, and for controlling operational modes of said playback system means and recording system means by transmitting a mode signal to said system controller means.

3. An editing apparatus as claimed in claim 2, wherein said key input means provides the starting point and ending point used to set said preset editing section on a control track of the recording medium in said playback system means, by altering a starting point and ending point duty ratio of said control track.

4. An editing method for operating an audio/video information duplicating system including a recording system having a recording deck driver and a playback system having a playback deck driver, said recording system and playback system being formed in a unit, a dubbing portion, a display, a key input, an edit adjuster, and a system controller, said method comprising the steps of:
   setting an editing section by marking starting and ending points of at least one section to be edited in a program recorded on a first recording medium in a playback deck through said key input;
   detecting marking information pertaining to said starting point set in the step of setting said editing section while fast forwarding said first recording medium, stopping and then rewinding said first recording medium a predetermined interval after detecting said marking information pertaining to said starting point, and placing said playback system in a play mode until said marking information pertaining to said starting point is again detected;

performing a first editing comprising:

automatically duplicating a signal reproduced in said playback system onto a second recording medium in said recording system, returning to the step of detecting said marking information upon detection of said ending point, and continuously checking for said marking information from an initial point to a final point of said first recording medium in said playback deck;

said first editing performed in response to said edit adjuster performing the steps of:

generating a first toggled signal in response to a start mark information signal, generating a second toggled signal in response to an end mark information signal, comparing a record mode signal indicating an editing mode of said editing apparatus and said first toggled signal to generate a first intermediate signal, comparing said record mode signal and an index information signal indicating setting of said editing section to be reproduced to generate a second intermediate signal, comparing said first and second intermediate signals to generate a third intermediate signal, comparing said record mode signal and said second toggled signal to generate a fourth intermediate signal, and comparing said third and fourth intermediate signals to generate a first mode control signal controlling operation of said playback system means and said recording system means.

5. An editing method as claimed in claim 4 wherein a period for performing said rewinding of said first recording medium is approximately one frame in duration.

6. An editing method as claimed in claim 4, further comprising a step of performing a second editing comprising:

detecting only said marking information up to and including at least one starting point and one ending point by controlling one editing mode among at least one set during said step of setting an editing section; and duplicating said editing section by setting said playback system and said recording system to a predetermined operational mode when said starting point is detected among said marking information.

7. An editing method as claimed in claim 6, wherein said step of performing a second editing is set under an editing stand-by state by moving said first recording medium to a point to be edited under control of a user through said key input, before detecting said marking information.

8. An editing method as claimed in claim 7, wherein said step of performing a second editing further comprises the step of detecting said starting point again by performing said rewind and play modes during the detection of said starting point.

9. An editing apparatus used to duplicate audio and video signals from a first recording medium to a second recording medium, said editing apparatus comprising:

playback means for reproducing the audio and video signals from the first recording medium to generate reproduced signals, and for writing starting and ending points of a section of the first recording medium that is to be duplicated onto the second recording medium;

recording means for recording said reproduced signals onto the second recording medium;

dubbing means for transferring said reproduced signals from said playback means to said recording means;

information reception means for receiving user designated commands designating said section of the first recording medium to be duplicated onto the second recording medium, to generate command signals;

system control means for receiving starting and ending point indication signals from said playback means and said command signals, for generating starting and ending mark information signals in response to said starting and ending point indication signals, respectively, and for controlling said playback means, recording means and dubbing means; and edit mode control for controlling modes of operation of said playback means and recording means in response to said starting and ending mark information signals;

said edit mode control means comprising:

first toggle switch means for generating a first toggled signal in response to said start mark information signal;

second toggle switch means for generating a second toggled signal in response to said end mark information signal;

first logic means for comparing a record mode signal indicating an editing mode of said editing apparatus and said first toggled signal to generate a first intermediate signal;

second logic means for comparing said record mode signal and an index information signal indicating setting of said section to be reproduced, to generate a second intermediate signal;

third logic means for comparing said first and second intermediate signals to generate a third intermediate signal;

fourth logic means for comparing said first and second toggled signals to generate a fourth intermediate signal;

fifth logic means for enabling said transfer of said reproduced signals from said playback means to said recording means by comparing said third and fourth intermediate signals to generate a first mode control signal controlling operation of said playback means and recording means;

sixth logic means for enabling said playback means to fast forward means to fast forward said first recording medium to said starting point of said editing section by comparing said first mode control signal from said fifth logic means and an automatic/manual control signal indicating said editing mode to generate a second mode control signal controlling said playback means.

10. The editing apparatus as claimed in claim 9, wherein said editing apparatus operates to control modes of operation of said playback means and recording means after said starting and ending points have been written onto the first recording medium and said editing apparatus only controls said recording means when said playback means reads said starting point during a reproduction mode of said playback means and recording means.

11. The editing apparatus as claimed in claim 9, wherein said starting point is written onto the first recording medium by changing a first control pulse duty ratio to a starting point duty ratio and said ending point is written onto the first recording medium by changing a second control pulse duty ratio to an ending point duty ratio.

12. The editing apparatus as claimed in claim 11, wherein said starting point duty ratio is greater than said ending point duty ratio.

13. The editing apparatus as claimed in claim 9, further comprising:
display means for displaying said reproduced signals; and
superimposed information generator means generating information signals to be superimposed over said reproduced signals on said display means.

14. An editing method of duplicating audio and video signals from a first recording medium controlled by playback means to a second recording medium controlled by recording means, said editing method comprising the steps of:
designating a section of the first recording medium to be duplicated onto the second recording medium;
rewinding the first recording medium;
fast-forwarding the first recording medium;
searching for a starting point of said designated section to be duplicated;
stopping the first recording medium upon detection of the starting point;
rewinding the first recording medium until approximately one frame before the starting point;
stopping the first recording medium;
playing the first recording medium;
detecting the starting point of the first recording medium a second time;
duplicating the audio and video signals from the first recording medium to the second recording medium;
detecting an ending point of said designated section to be duplicated; and
terminating said step of duplicating the audio and video signals from the first recording medium to the second recording medium;
said editing method enabled by an edit adjuster:
generating a first toggled signal in response to a start mark information signal,
generating a second toggled signal in response to an end mark information signal,
comparing a record mode signal indicating an editing mode of an editing apparatus and said first toggled signal to generate a first intermediate signal,
comparing said record mode signal and an index information signal indicating setting of said section to be duplicated to generate a second intermediate signal,
comparing said first and second intermediate signals to generate a third intermediate signal,
comparing said record mode signal and said second toggled signal to generate a fourth intermediate signal, and comparing said third and fourth intermediate signals to generate a first mode control signal controlling operation of said playback means and said recording means.

15. The editing method as claimed in claim 14, wherein said step of designating a section of the first recording medium comprises:
playing the first recording medium;
marking said starting point on the first recording medium;
marking said ending point on the first recording medium; and
sensing a final point on the first recording medium.

16. The editing method as claimed in claim 15, wherein said step of rewinding the first recording medium comprises:
stopping the first recording medium;
rewinding the first recording medium;
stopping the first recording medium if a stop instruction is received;
sensing an initial point of the first recording medium; and
stopping the first recording medium.

17. The method as claimed in claim 16, further comprising the steps of:
stopping the first recording medium and the second recording medium;
fast-forwarding the first recording medium; and
detecting a final point of the first recording medium.

18. The method as claimed 16, wherein:
said step of marking said starting point on the first recording medium comprises:
changing a first control pulse duty ratio to a starting point duty ratio; and said step of marking said ending point on the first recording medium comprises:
changing a second control pulse duty ratio to an ending point duty ratio.

19. The method as claimed in claim 16, wherein said step of searching for said starting point comprises:
manually controlling modes of operation of the first recording medium to move the first recording medium to a position near the starting point;
manually controlling a stopping mode of the first recording medium when the starting point is detected;
manually controlling a rewinding mode of the first recording medium past the starting point;
manually controlling the stopping mode of the first recording medium;
manually indicating that a manual reproduction mode is desired;
playing the first recording medium; and
detecting the starting point of the first recording medium a second time.

20. The method as claimed 19, wherein:
said step of marking said starting point on the first recording medium comprises:
changing a first control pulse duty ratio to a starting point duty ratio; and said step of marking said ending point on the first recording medium comprises:
changing a second control pulse duty ratio to an ending point duty ratio.

* * * * *

UNITED STATES PATENT AND TRADEMARK OFFICE
CERTIFICATE OF CORRECTION

PATENT NO. :    5,331,474  
DATED :    Jul. 19, 1994  
INVENTOR(S) :    Hyeong-Ju LEE It is certified that error appears in the above-indentified patent and that said Letters Patent is hereby corrected as shown below:

| | | |
|---|---|---|
| Column 2, | line 67, | after "and", delete "the to"; |
| | line 68, | after "modes", insert a comma -- , --; |
| Column 4, | line 39, | before "is", change "mode REC" to --REC mode--; |
| Column 5, | line 8, | after "playback", insert --deck--; |
| Column 6, | line 42, | after "mode", delete "to"; |
| Column 7, | line 10, | after "and", change "then from" to --the other from--; |

UNITED STATES PATENT AND TRADEMARK OFFICE
CERTIFICATE OF CORRECTION

PATENT NO. : 5,331,474
DATED : Jul. 19, 1994
INVENTOR(S) : Hyeong-Ju LEE

It is certified that error appears in the above-indentified patent and that said Letters Patent is hereby corrected as shown below:

IN THE CLAIMS

Column 10, line 34, after "ending", change "pint" to --point--;

Column 12, line 55, after "forward", delete "means to fast forward":

Signed and Sealed this

Eighth Day of October, 1996

Attest:

BRUCE LEHMAN

Attesting Officer

Commissioner of Patents and Trademarks